July 17, 1934.  R. G. WULFF  1,966,779
METHOD OF PRODUCING ACETYLENE BY COMPRESSION OF NATURAL GAS
Filed May 11, 1931   3 Sheets-Sheet 1
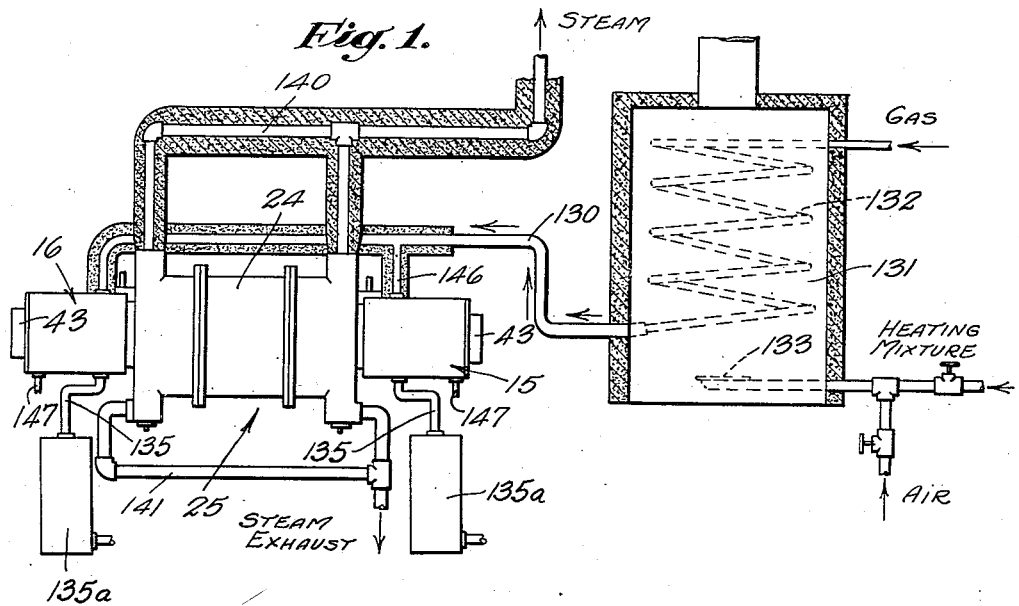
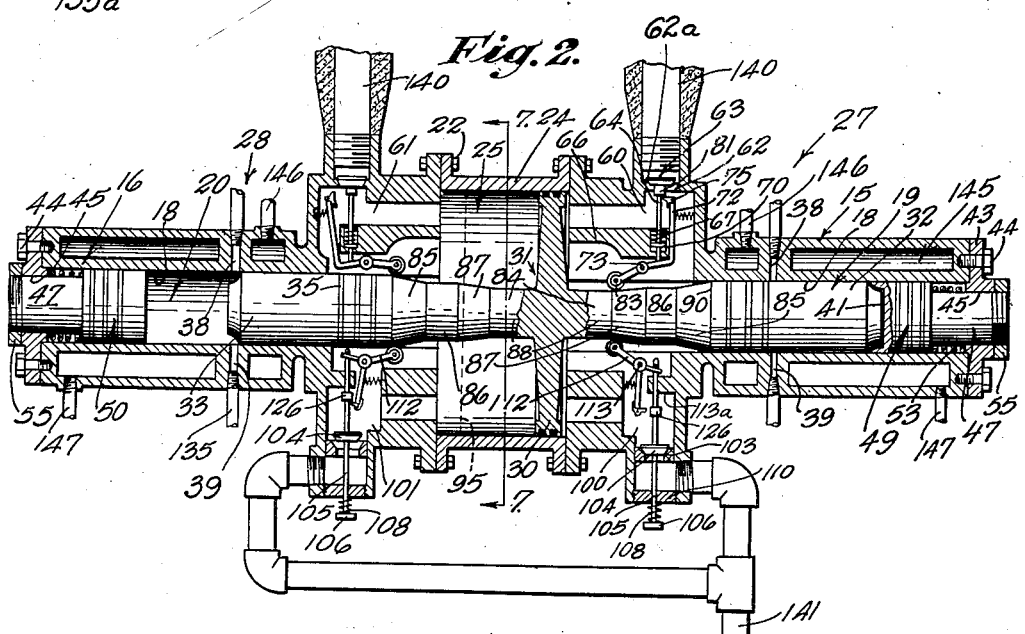
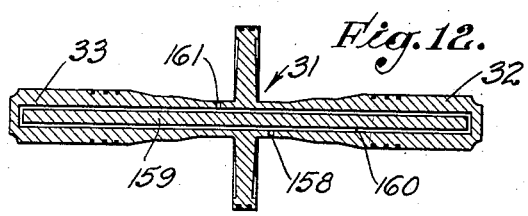
INVENTOR;
ROBERT G. WULFF.
BY
ATTORNEY.

July 17, 1934.  R. G. WULFF  1,966,779
METHOD OF PRODUCING ACETYLENE BY COMPRESSION OF NATURAL GAS
Filed May 11, 1931   3 Sheets-Sheet 2
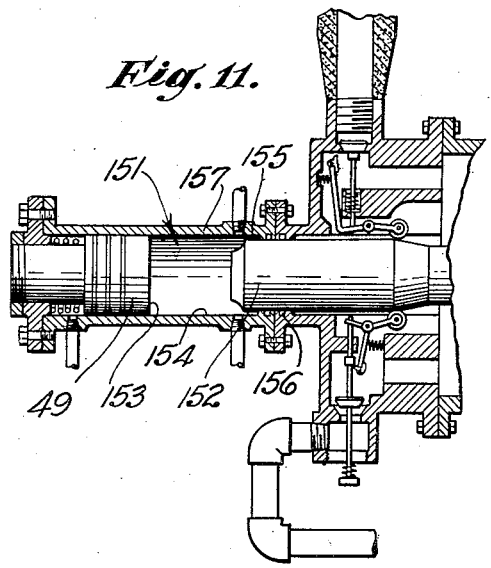
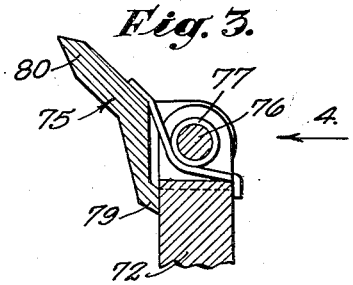
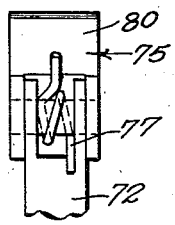
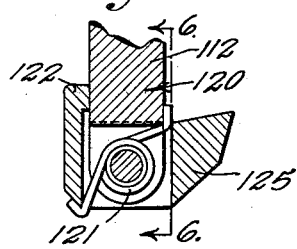
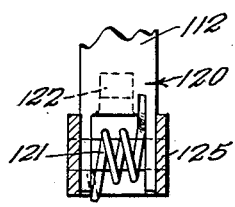
INVENTOR:
ROBERT G. WULFF
BY
ATTORNEY.

July 17, 1934.   R. G. WULFF   1,966,779
METHOD OF PRODUCING ACETYLENE BY COMPRESSION OF NATURAL GAS
Filed May 11, 1931   3 Sheets-Sheet 3
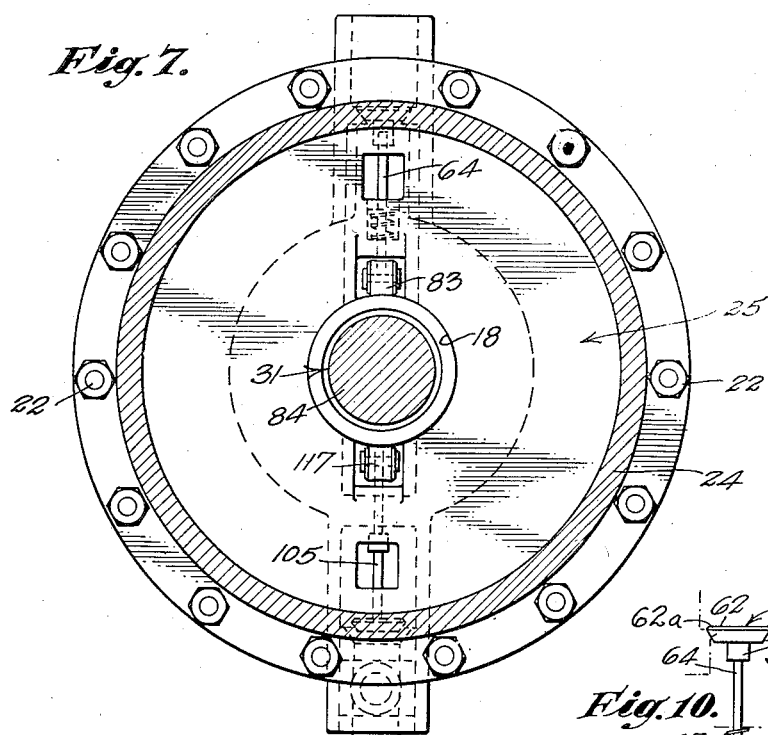
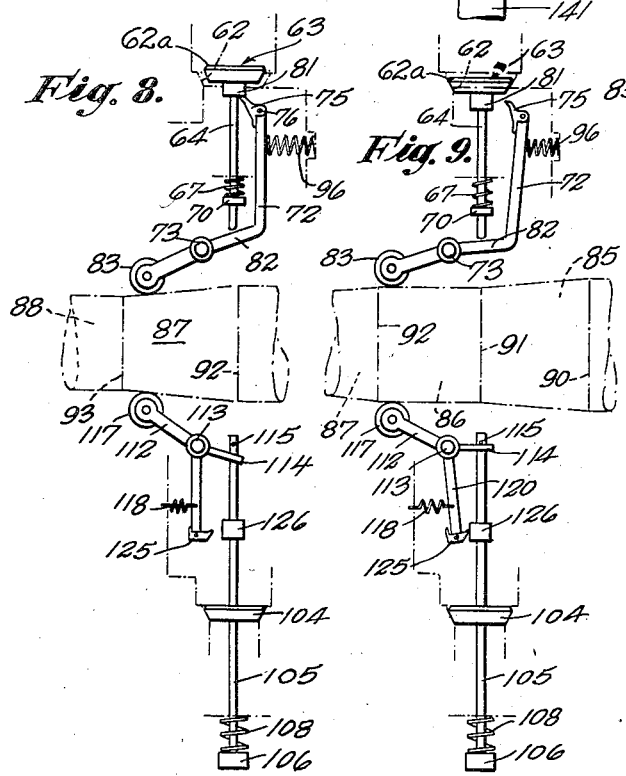
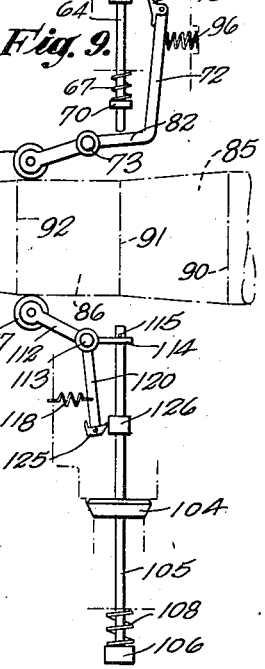
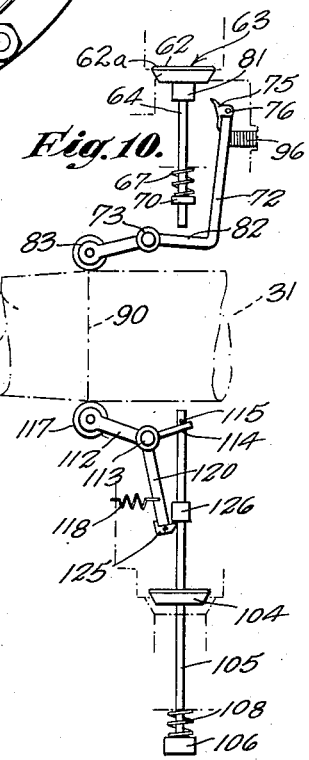
INVENTOR:
ROBERT G. WULFF
BY
ATTORNEY.

Patented July 17, 1934

1,966,779

UNITED STATES PATENT OFFICE 1,966,779

METHOD OF PRODUCING ACETYLENE BY COMPRESSION OF NATURAL GAS

Robert G. Wulff, Los Angeles, Calif., assignor to Wulff Process Company, Los Angeles, Calif., a corporation of California Application May 11, 1931, Serial No. 536,440

12 Claims. (Cl. 260—170)

My invention relates to the production of acetylene, and more particularly to a method of producing acetylene from hydrocarbons.

This invention is a continuation in part of my copending application, Serial No. 242,833, filed December 27, 1927.

The present commercially used method of producing acetylene is by the action of water on carbide. I have found that hydrocarbons may be treated to produce acetylene gas at a cost which is much less than the cost of the gas produced by the use of carbide. Natural gas is available in large quantities and at a low cost, and is therefore an excellent raw material from which to obtain acetylene gas. I have also found that I can use natural gas containing large quantities of ethane, propane, butane, or extractable gasoline. I have found that I can make acetylene from still-vent gases of the usual gasoline cracking plants, such gases containing a high percentage of olefins. I have also found that I can use the vapors of hydrocarbons that are liquid at ordinary temperatures, such as gasoline, kerosene, and gas oil.

It is an object of my invention to provide a method of producing acetylene from a hydrocarbon such as natural gas or a hydrocarbonaceous vapor.

Another object of my invention is to provide a method of obtaining acetylene by heating a hydrocarbonaceous gas or vapor to a cracking temperature, the cracking occurring at a high pressure.

A further object of my invention is to provide a process for obtaining acetylene gas from a hydrocarbonaceous gas or vapor by adiabatically compressing this gas or vapor until it reaches a cracking temperature at which acetylene is formed, and subsequently expanding the cracked products to cool them and bring the acetylene into a stable state.

I have found it desirable to compress the gas relatively quickly to a cracking temperature and thereafter compress it still further until a maximum yield of acetylene is obtained.

Another object of my invention is to provide a method of compressing a gas to a predetermined pressure and thereafter relatively slowly compressing the gas to a still higher pressure against the action of a resiliently mounted portion of the apparatus.

Another object of my invention is to provide a method of producing acetylene from a hydrocarbon which comprises compressing a preheated hydrocarbon, continuing the compression in a delayed manner to produce additional acetylene, and then rapidly chilling the compressed gas by causing the compressed gases to do mechanical work.

In performing my process, I have found it advantageous to use a double-acting steam engine of novel design, the piston rod of this engine being directly connected to one or more pistons operating in compression cylinders, these compression cylinders being adapted to compress the gas from which acetylene is to be derived.

It is an object of my invention to provide a novel type of steam engine in which the valves are operated by a cam surface on the piston rod itself.

Another object of my invention is to provide a steam engine which is directly connected to the piston of a compressor, the expansion of the steam being adapted to compress the gas in the compression cylinder of the compressor.

Further objects and advantages will be made evident hereinafter.

The method and apparatus of my invention may best be understood by reference to the drawings, in which—

Fig. 1 is a diagrammatic utility view illustrating the process of my invention.

Fig. 2 is a vertical cross-sectional view of the combined steam engine and compressor of my invention.

Fig. 3 is a detailed view of a catch on the intake valves of my invention.

Fig. 4 is a view taken in the direction of the arrow 4 of Fig. 3.

Fig. 5 is a detailed view of the catch on the exhaust valves of my invention.

Fig. 6 is a sectional view taken along the line 6—6 of Fig. 5.

Fig. 7 is a vertical sectional view taken along the line 7—7 of Fig. 2.

Figs. 8, 9, and 10 are diagrammatic representations of the operation of the valve mechanisms of my invention.

Fig. 11 is a diagrammatic utility view of another form of my invention.

Fig. 12 is a sectional view of the moving element in another modification of my invention.

For the sake of clearness and illustration the apparatus and method of my invention are described as using natural gas as a material from which to produce acetylene.

Referring particularly to Fig. 2, the mechanism of my invention comprises primary and secondary compression shells 15 and 16. Each of these shells may conveniently be cast in a single piece, as indicated in Fig. 2. Extending through each compression shell is a bore 18, this bore defining the outer walls of primary and secondary compression chambers 19 and 20.

Each of the compression shells is joined by bolts 22 to a steam cylinder shell 24, this steam cylinder shell defining a steam cylinder 25 between the primary and secondary compression shells 15 and 16. Arbitrarily, and merely for the sake of convenience, I shall term that portion of the apparatus of my invention which is situated to the right of the central vertical axis of the steam cylinder shell 24 as a primary mechanism 27, while that portion of the mechanism to the left of this central axis will be termed a secondary mechanism 28. The primary and secondary mechanisms 27 and 28 are substantially identical.

A steam piston 30 is adapted to reciprocate in the steam cylinder shell 24 to drive a piston rod 31 which is formed integrally therewith. At one end of the piston rod 31 is formed a primary compression piston 32, while at the other end of the rod is formed a secondary compression piston 33. These primary and secondary compression pistons are adapted to reciprocate in the bores 18 of the compression shells 15 and 16, these pistons having suitable rings 35 adapted to form a tight fit with the walls of the compression chambers 19 and 20. Intake and exhaust gas ports 38 and 39 are formed respectively above and below each of the compression shells 15 and 16, these ports communicating with the compression chambers 19 and 20. These ports are oppositely positioned and laterally aligned, and are adapted to be normally covered by the compression pistons 32 and 33 except when these pistons are in an extremely retracted position, as shown in the secondary mechanism 28 of Fig. 2. When in this extreme retracted position, the ports 38 and 39 are simultaneously uncovered and the gas under pressure enters the intake ports 38. This gas impinges on a curved head portion 41 of the piston, and is thereby deflected into the compression chamber rather than being allowed to travel in a path directly toward the open exhaust port 39.

Closing the outer ends of each of the primary and secondary compression chambers 19 and 20 is a head 43. Those heads are adapted to be secured to the compression shells 15 and 16 by means of bolts 44. Each of the heads 43 has an opening 45 which slidably journals a shaft 47. Primary and secondary auxiliary pistons 49 and 50 are secured to the shafts 47, these pistons being adapted to engage the inner walls of the compression chambers 19 and 20. Suitable piston rings may be placed on the pistons 49 and 50 to secure a tight junction with the walls of the compression chambers. Compressed between each auxiliary piston and its corresponding head 43 is a compression spring 53, this compression spring tending to force the auxiliary piston farther into the bore 18. The maximum inward position of the auxiliary pistons is determined by nuts 55 which are threadedly secured to the outer end of each shaft 47 and engage an outer portion of the heads 43. The inner end of each of the pistons 49 and 50 is formed to correspond in shape to the end portions 41 of primary and secondary pistons 32 and 33 so that a small clearance volume is obtained between the compression pistons and the auxiliary pistons. It should be clear that this clearance volume may be adjusted by turning the nuts 55 relative to the shafts 47 and that the auxiliary pistons may be so positioned in the compression chambers 19 and 20 that the paths of travel of the compression pistons and the auxiliary pistons may even overlap if desired. In the latter event a gas which is being compressed in the compression chambers will decrease in volume and increase in pressure until the pressure thereof acting on the auxiliary piston 49 is sufficiently great to overcome the compression of the spring 53, at which time the auxiliary piston will be forced outward. The clearance volume between the compression piston and the auxiliary piston at this time will be relatively small and will slowly decrease as the pistons are simultaneously moved by means of the medium of the compressed gas therebetween. This is due to the fact that the force exerted by a spring is a function of the degree of compression of the spring at that instant.

The primary and secondary compression pistons 32 and 33, together with the steam piston 30, are simultaneously reciprocated by steam which is alternately supplied to opposite sides of the steam piston 30 through primary and secondary intake ports 60 and 61 formed through the top of the primary and secondary compression shells 15 and 16 respectively. Formed in each primary and secondary intake port is a seat 62 adapted to be closed by a poppet 62a of an intake valve 63. Each poppet 62a has a stem 64 which is slidable in a wall 66 of each compression shell 15 and 16. A spring 67 is adapted to surround the stem 64 and to be compressible between a portion of the wall 66 and a washer 70 secured to the stem 64 when the valve 63 is open. The spring 67 is adapted to normally keep the intake valve 63 seated against the seat 62.

The operation of each intake valve 63 is controlled by primary and secondary intake valve arms 72, these arms being pivoted at a point 73 to the wall 66. The upper end of each arm 72 is provided with a catch 75, as best shown in Figs. 3, 4, 8, 9, and 10. Each catch 75 is pivoted to the extreme upper end of one arm 72 by means of a pivot pin 76. A coil spring 77 is adapted to force the catch 75 in a counter-clockwise direction, the movement of the catch 75 being arrested by a lug 79 which engages a portion of the arm 72. A tip 80 of each catch 75 is adapted to engage the outer periphery of a boss 81 of the stem 64 when the upper end of the arm 72 is moved toward the stem 64. Thus, as the arm 72 pivots about the pivot point 73 the tip 80 will engage this boss and will compress the spring 77 by separating the lug 79 from engagement with the arm. The lower end of the stem 64 is adapted to be engaged by a portion 82 of each arm 72 when the top of this arm is approaching the stem. Thus the spring of the catch 75 is depressed until the tip 80 slips under the boss 81 when the stem 64 has been raised a distance through contact with the portion 82 of the arm 72.

A roller 83 is pivotally secured to each arm 72 at the lower end thereof, these rollers being adapted to engage cam portions 84 of the piston rod 31. These cam portions are best formed as indicated in Figs. 2, 8, 9, and 10 and comprise what I call an exhaust cam surface 85 which may converge from a diameter equal to that of the outer periphery of the compression pistons to the smaller diameter of an intermediate cam portion 86. This intermediate cam portion is cylindrical in shape. Adapted to converge from the diameter of the intermediate cam 86 is an intake cam portion 87, this intake cam portion extending to a central portion 88 of the piston rod, this central portion being immediately adjacent to the piston 30. The junction between the exhaust cam 85 and the compression piston is indicated by the numeral 90, while the junction between this exhaust cam and the intermediate cam is indicated by the numeral 91. Similarly, the junction between the intake cam 87 and the intermediate cam 86 is indicated by the numeral 92, while the junction between this intake cam and the central portion 88 is indicated by the numeral 93. The roller 83 of each of the arms 72 is adapted to successively engage the intake, intermediate, and exhaust cam portions 87, 86, and 85 respectively, during the reciprocating strokes of the piston rod 31. In other words, in Figs. 2, 8, 9, and 10, the roller 83 is adapted to engage the cam surfaces extending between the points 93 and 90. Thus it will be seen that in moving the piston 30 from its full line position shown in Fig. 2 to its dotted line position 95, the primary intake valve arm 72 will be pivoted clockwise about the pivot pin 73 inasmuch as the roller 83 rises during this stroke, following the cam surfaces 87, 86, and 85 in sequence. Similarly, the secondary intake valve arm 72 will pivot about a corresponding point 73 so as to turn in a clockwise direction. This is due to the fact that the roller 83 on the secondary intake valve arm follows the periphery of the secondary cam surface in the sequence 85, 86, and 87. A compression spring 96 is adapted to be compressed between each arm 72 and a portion of the compressor shell so that the upper ends of these arms will always tend to be forced inward through the action of these springs. This spring insures that the rollers 83 will always contact the cam surfaces 84.

The steam entering the intake ports 60 and 61 is adapted to be exhausted when spent through primary and secondary exhaust ports 100 and 101. Valve seats 103 are secured in each of the ports 100 and 101. Exhaust valves 104 are adapted to engage the seats 103, these exhaust valves having stems 105 extending therethrough. A collar 106 on the lower end of each exhaust stem 105 is adapted to be forced downward by the action of a spring 108 compressed between the collar and a plug 110. Each plug 110 closes the lower end of one of the exhaust ports and has an opening through which the stem 105 slides. The springs 108 are adapted to resiliently hold the exhaust valves 104 in engagement with their respective seats 103. An exhaust rocker arm 112 is pivoted at 113 to a wall 113a of each compression shell, this rocker arm being adapted to actuate the exhaust valve 104 situated below it. As best shown in Figs. 2, 8, 9, and 10, each exhaust rocker arm 112 has a bifurcated clip 114 which is adapted to engage a pin 115 secured to the upper end of the stem 105 when the rocker arm 112 is rotated in a proper direction. Each rocker arm 112 is adapted to be pivoted about the pivot point 113 by means of a roller 117 secured to the upper end of the rocker arm. The rollers 117 are adapted to, in turn, engage the intake, intermediate, and exhaust cams 87, 86, and 85 respectively as the piston rod 31 is reciprocated. Tension springs 118 are adapted to keep the rollers 117 in engagement with the cam surfaces 85 to 87. At the lower end of each rocker arm 112 is pivoted a catch 120, as best shown in Figs. 2, 5, 6, 8, 9, and 10. A spring 121 is adapted to force the catch 120 in a direction to cause an engagement between a lug 122 and the rocker arm 112, as shown in Fig. 5. This lug is adapted to break contact with the rocker arm when the spring 121 is compressed. A tip 125 of the catch 120 is adapted to engage the outer periphery of a boss 126 formed on the stem 105. This engagement takes place when the valve 104 is seated, and during this engagement the spring 121 is deformed, allowing the catch 120 to pivot on the lower end of the rocker arm 112. This engagement between the tip 125 and the outer periphery of the boss 126 ceases when the valve 104 is raised. This raised condition occurs when the roller 117 reaches such a position on the cam surfaces 84 that the bifurcated clip 114 comes into contact with the pin 115 at which time the exhaust valve is raised and the tip 125 slips under the boss 126.

In performing the process of my invention, a preheated natural gas is supplied to the primary and secondary intake ports 38 through a pipe 130. This gas may be conveniently heated in a preheater 131 having a coil 132 therein, this coil connecting to the pipe 130. A burner 133 heats the coil and the natural gas therein. When the piston rod 31 is in the position shown in Fig. 2, the gas in the pipe 130 may enter the secondary compression chamber 20 through the intake port 38 thereof, forcing any previously treated gas from the compression chamber through the exhaust port 39, from whence it is conducted by a pipe 135 to a cooler 135a in which the gas is cooled as rapidly as possible to a temperature at which acetylene is stable. From the cooler 135a the gas passes to a suitable storage or separating apparatus. Steam at this instant is being supplied to the primary intake port 60 through a suitable steam pipe 140. As shown in Fig. 2, the intake valve 63 is at this instant open, the catch 75 of the arm 72 engaging the lower portion of the boss 81 to hold this valve open. Steam thus enters the steam cylinder 25 on the right-hand side of the piston 30, this steam tending to force the piston leftward. As the piston moves leftward, the rollers 83 and 117 of the primary mechanism 27 engage the intake cam 87. Simultaneously, the rollers 83 and 117 of the secondary mechanism 28 engage the exhaust cam 85. When the rollers are thus engaged and the piston rod 31 is moved leftward, the roller 83 of the primary mechanism will rise, thus separating the portion 82 of the arm 72 and the lower end of the stem 64. The valve 63 cannot close at this instant because of the fact that the catch 75 is engaging the lower surface of the boss 81. This condition is most clearly indicated diagrammatically in Fig. 8, which shows the rollers bearing against the intake cam 87 just after leaving the point 93. The intake valve 63 is adapted to be held open by the catch 75 until the roller 83 reaches the point 92, at which time the catch 75 becomes separated from the lower surface of the boss 81. This allows the valve to close, due to the action of the spring 67. The movement of the piston 30 up until this instant has been caused by live steam entering the intake port 60 of the primary mechanism 27. When the valve 63 closes, "cut-off" occurs, and further movement of the piston 30 is brought about by the expansion of the steam admitted through the intake port.

When the rollers 83 and 117 have reached the point 92, the position of the valves is indicated in Fig. 9. It should thus be noticed that the tip 125 of the catch 120 has engaged the outer periphery of the boss 126, thus turning this catch in a counter-clockwise direction. The bifurcated clip 114 at this time is just coming into engagement with the pin 115, but the exhaust valve 104 is closed when the roller 117 engages the intermediate cam 86 when the piston 30 is moving leftward.

During the time that the rollers 83 and 117 engage the cylindrical intermediate cam 86, this position being shown in Fig. 9, the valves 63 and 104 are not moved. When the roller 117 reaches the point 91, however, the clip 114 begins to raise the exhaust valve 104, thus allowing the steam to escape from the steam cylinder through a suitable exhaust pipe 141 connected to the exhaust ports. As the piston rod is moved still further leftward, the rollers 83 and 117 approach the point 90. As this occurs the exhaust is still farther raised until just before reaching the point 90, the tip 125 of the catch 120 slips under the boss 126. During this movement over the exhaust cam 85, the roller 83 turns the arm 72 clockwise against action of the spring 96, but this motion has no effect on the intake valve 63. When the point 90 is reached, the position of the valves is best shown in Fig. 10.

During this leftward movement of the piston 30, the exhaust valve 104 of the secondary mechanism 28 has been open, thus allowing the exhaust gases on the left-hand side of the piston 30 to be discharged through the exhaust pipe 141. When the piston 30 is in the position shown by dotted lines 95, the intake valve of the secondary mechanism opens and forces the piston 30 into the full line position shown in Fig. 2. As this occurs, the rollers 83 and 117 of the primary mechanism again engage the exhaust cam 85. The roller 117 as it travels down this cam, causes the rocker arm 112 to turn in a clockwise direction. The bifurcated clip 114 thus moves downward, but the exhaust valve 104 is prevented from seating through contact with the catch 120, the tip 125 of which engages the lower surface of the boss 126. This engagement takes place until the roller 117 passes the point 92, at which time the exhaust valve is allowed to seat. During this operation, the roller 83 successively engages the exhaust cam 85 and the intermediate cam 86. After the roller 83 has passed the point 92, the catch 75 comes into contact with the periphery of the boss 81, thus depressing the spring 77. As the roller 83 moves still farther down the intake cam 87, the portion 82 of the arm 72 engages the lower end of the stem 64, this raising the intake valve 63. Just before the roller 83 reaches the point 93, the valve is raised sufficiently high to allow the spring 77 to force the tip of the catch 75 under the boss 81, thus holding the valve 63 open.

While I have described only the operation of the primary mechanism 27, it should be understood that the secondary mechanism 28 operates in a similar manner. The two mechanisms comprise a double-acting steam engine directly connected to a pair of compressors, these compressors being adapted to compress and expand a gas.

When the piston 30 is in its dotted line position 95 preheated natural gas is supplied to the intake port 38. As the piston 30 moves to the right it carries the piston rod 31 and the primary compression piston 32 with it. A slight movement of the piston 32 closes the ports 38 and 39 and allows the charge of gas which has entered the compression chamber to be compressed. As this compression occurs the gas is heated to a very high temperature and the walls of the compression chamber are kept at safe temperatures by means of a water jacket 145 supplied with suitable cooling fluid through pipes 146 and 147. The compression in the compression chamber 19 raises the temperature of the gas. When the compressed gas reaches a sufficient pressure it will force the auxiliary piston 49 to the right against the action of the spring 53. A further movement of the compression piston 32 will be followed by a corresponding movement of the auxiliary piston 49. The auxiliary piston, however, will not move quite as far or as fast as the piston 32. This is due to the fact that the spring 53 exerts a greater pressure as it is compressed. Thus the gas is first compressed as the piston 32 moves toward the auxiliary piston 49, and this compression is continued during the time both pistons are simultaneously moving, this latter compression occurring, however, at a much slower rate. I have found this type of compression particularly advantageous in securing high yields of acetylene from natural gas inasmuch as the gas may be held under high temperatures over an appreciable length of time, so that a maximum yield of acetylene may be obtained. When cracking occurs, the gases formed have a volume which is larger than the volume of the gas before cracking, thus increasing the pressure in the clearance space between the two pistons. As the piston 32 moves leftward, these cracked gases expand until when the primary compression piston 32 is in its extreme retracted position, the cracked gases in the compression chamber 19 will escape through the port 39, and the pipe 135 will conduct them to a cooler 135a in which the cracked gases are cooled as quickly as possible to a temperature at which acetylene is stable. The cracked gases then pass to either storage or to suitable apparatus for separating the acetylene from the other products formed, this auxiliary apparatus forming no part of my invention, being well known in the art.

In order to analyze the action of such a combined compressor and steam engine as is shown in the drawings, an analysis of the forces acting on the piston rod 31 and its attached pistons is necessary. When the piston 30 is in its dotted line position 95, as shown in Fig. 2, steam is entering the intake port 61 of the secondary mechanism 28. Thus the piston rod and attached pistons are acted upon by certain forces which tend to move the piston 30 through its stroke into its full line position. At the very beginning of this stroke, these forward forces include the steam entering the intake port 61, the gas previously compressed between the pistons 33 and 50 of the secondary mechanism 28, and the compression of the spring 53 of the secondary auxiliary piston 50, if this spring has been compressed. At this same instant the forces retarding the movement of the piston 30 from its dotted line position into its full line position are composed of the compression of the gas in the primary compression chamber 19, and the inertia of the piston rod with its attached pistons, together with small amounts of other retarding forces due to the steam being expelled through the exhaust valve 104 of the primary mechanism, and small frictional forces. The point of maximum speed of the piston 30 determines the maximum kinetic energy of the piston rod and the attached pistons. This point is ordinarily reached near the cut-off point, and thereafter the steam to the left of the piston 30 expands, pushing the piston 30 before it. During this latter part of the stroke the kinetic energy in the piston rod and attached pistons is decreasing, this kinetic energy being used to help the forward movement of the piston rod. When the gas between the primary compression piston 32 and the auxiliary piston 49 becomes compressed high enough to force the auxiliary piston to the right against the action of the spring 53, this spring is also added to the list of retarding forces previously mentioned. It is necessary to adjust the pressure of the incoming steam, the point of cut-off, and the mass of the piston rod 31 with its attached pistons so that just sufficient energy is given to the piston rod in order that the gas in the primary compression chamber 19 may be compressed so as to give a maximum yield of acetylene gas. This balance can best be obtained empirically.

It should thus be apparent that the energy stored in the spring 53 and in the compressed gas in the primary compression chamber 19 is largely returned to the piston rod and its attached pistons, this energy being used in compressing the next charge of gas in the secondary compression chamber 20. When the above-mentioned forces are properly balanced, a very high yield of acetylene from natural gas may be obtained. This is probably due to the novel method of compressing the gas, this gas being first quickly compressed to a cracking temperature, and subsequently slowly compressed still further against the action of the spring-actuated auxiliary piston, until a maximum yield of acetylene is obtained from the natural gas. Thus the gas is held under high pressure and high temperature over an appreciable length of time rather than being compressed just to the cracking temperature and being immediately expanded, as would be the case in the commonly used types of compressors.

The operation of the timing mechanism of the steam engine may, of course, be varied by varying the dimensions and shapes of the catches 75 and 125 and the arms 72 and 112 without departing from the spirit of my invention. By properly proportioning these parts, it is possible to obtain a relatively quick cut-off and long expansion, or vice versa, as well as to hold the exhaust valves open or closed over longer or shorter periods of time. In the drawings, I have shown the exhaust and intake cams 85 and 87 as being of frusto-conical form. It is entirely within the scope of my invention to form these on any desirable curve so as to accomplish a different timing of the engine.

The following is a concrete example giving an illustration of the quantitative figures applicable to a process of this nature. Using primary and secondary pistons 32 and 33 of six inch diameter, and a 1.5 foot stroke, a suitable weight of reciprocating piston assembly is about 400 lbs.

The raw material is preheated before being compressed in order to reduce the pressure to which the gas must be compressed in order to produce substantial amounts of acetylene. Thus, by preheating the gas, a shorter stroke may be used. Furthermore, the preheating of the gas effects a distinct economy in that a given amount of heat imparted to the gas before it enters the compression cylinder is multiplied many times in the final temperatures formed therein.

In using natural gas having the approximate composition of 85% methane and 15% ethane, I prefer to preheat the raw material to about 960° F.

When the compression has reached 115 atmospheres, the temperature would be 3600° F. in the absence of cooling due to the walls. This amount of cooling depends on the construction of the cylinder and the jacket, but in all cases is adjusted so that the gas essentially reaches a temperature of 2500° F. or more. The acetylene starts forming in substantial quantities at approximately this temperature, but more efficiently at higher temperatures. At this point, however, the formation of acetylene has not been completed, nor has the compression come to an end. The resilient head for further delayed compression comes into play here, permitting the piston to increase the pressure on the charge of gas to approximately 180 atmospheres. During this latter period substantially all of the energy of compression is going into the formation of acetylene, since the formation of acetylene is an endothermic reaction and therefore requires heat to form it. At the same time, of course, there are unavoidable losses of energy, such as in the cracking of the natural gas to products other than acetylene, which in general are not wanted, and to loss of heat through the walls. The result is that there is no substantial rise in temperature that accompanies this latter increase in pressure.

The initial volume of the cylinder before compression is 0.294 cu. ft. The volume at the point where acetylene begins to form in substantial quantities, that is, at the pressure of approximately 115 atmospheres, is 0.00735 cu. ft., and the volume when the action has finished and the piston has stopped is 0.0047 cu. ft. The piston then changes its direction and reexpands the gas it has compressed, thereby cooling the said gas to about 930° F. The final pressure of the gas will be more than the one atmosphere because there has been an increase in the volume of said gas due to the cracking. The pressure at the end of the stroke will be approximately 1.25 atmospheres, if the gas was taken in at one atmosphere. The gas then passes through a condenser where it is cooled as quickly as possible to a temperature at which acetylene is stable. The maximum speed attained by the reciprocating assembly of pistons under the conditions given above will be about 37 feet per second.

Thermal formation of acetylene generally begins at about 1800° F., and does so also in the compressor process herewith brought out, but in view of the retarding effect that the pressure exerts, it is desirable to go to higher temperatures. Ordinarily I have found that the higher the temperature in the compression chamber, the larger the yield of acetylene. It is known to be common in compressors to work to very small clearances at the end of the stroke of the piston. In the case of the illustration given above, I have shown that the end volume of the stroke, that is, the minimum volume to which the compressed gas is reduced before expanding, is 0.0047 cu. ft. On a piston diameter of six inches, as assumed, the end clearance is found to be about 0.25 inches, which is, of course, ample, and would allow for still further compression.

It is obvious that the dimensions and quantities given above for the pressures attained and the speeds used can be varied considerably without losing the result desired. For instance, the time required for a stroke of the piston above described is about 0.1 second, while the portion of the stroke which makes substantial amounts of acetylene near the end of the said stroke, occupies not more than 0.02 second and probably not more than 0.01 second. This is a very difficult period to determine. It is, however, true that the acetylene forming period may be increased considerably or decreased considerably and still preserve the formation of acetylene substantially by altering other functions accordingly. With increased time at the end of the stroke the temperature need not be so high, that is, the pressure can be lower, and vice versa. Such alteration in speed can be made by using a heavier reciprocating mechanism for the size of pistons 32 and 33 used, which makes the action slower. In this manner the actual interval of time in which acetylene is forming may be increased from about 0.01 second to about 0.05 second, or even 0.10 second with extreme designs. In general I have found that the full stroke of a compressor of this invention will occupy about ten times the time of forming substantial amounts of acetylene. In other words, if the acetylene forms in 0.10 second, the stroke will occupy about 1.0 second.

In the modified form of my invention which is illustrated in Fig. 11, the compression of the natural gas or other hydrocarbon gas or vapor is substantially adiabatic. This is accomplished by the use of insulating coatings and by providing a clearance between the cylinder and the piston. Referring to the drawings, 151 is a cylinder replacing cylinder 20, and 152 is a piston replacing piston 33. The auxiliary piston 49 may be the same as previously described and having a lining of temperature resistant enamel on its face 153.

The cylinder wall 154 of the cylinder 151 is enamelled in the same way. The free or left end of the piston 152 is also enamelled so that during the existence of the high temperature, at least the walls confining the small volume at the approximate end of the stroke will not be exposed to the heat without the protection of an insulating material. Between the piston 152 and the cylinder wall 154 there is a clearance diagrammatically indicated by the numeral 155 so that there is no mechanical friction. This clearance in general is so small as to be negligible, that is, so that most of the volume of the hot gas at the end of the stroke is at the end of the piston 152 and not in the clearance 155. In this manner the amount of heating of the cylinder wall 154 away from the left end of the compression chamber, and similarly for the piston 152, will be small. The numeral 156 indicates piston rings or packing to reduce leakage of gas to a practical condition and since the piston 152 is packed far enough back from its free end when it is in the most withdrawn position in the cylinder 151, that is, when it is in its extreme right position, the rings 156 operate on a machined surface of the piston 152 which is not subject to appreciable heat. The material 157 of the cylinder 151 may be of heat resistant metal so that it may be insulated to hold the heat generated by the compression in the interest of efficiency of acetylene formation.

In another modification of my invention the pistons 32 and 33 may be artificially cooled to a limited extent, for example, by means of the waste steam from the steam cylinder. As shown in section in Fig. 12, internal ports are provided for the purpose of cooling the pistons 32 and 33 with a portion of the operating steam. To this end when steam pressure is being applied to the right side of the piston 31, part of said steam may enter the port 158 and travel in ducts 159 and 160, finally making exit therefrom through the port 161 into the chamber 25 on the left side of the piston 31. Conversely, when steam pressure is being applied to the left side of the piston 31, steam may travel through the same channels in the opposite direction, entering the chamber on the right side of the piston 31. In each case the steam so used for cooling makes its exit from the apparatus together with the exhaust steam of the previous stroke. This modification may be used whether the cylinder walls are water jacketed as shown in Fig. 2 or not, as shown in Fig. 11.

As previously mentioned, in using natural gas as the raw material, I prefer to preheat to about 960° F. Of course, the raw material may be preheated to temperatures either above or below this figure, but I have found that preheating to this temperature is both economical and expedient. Furthermore, I have found that if the raw material is preheated much in excess of this temperature, considerable premature cracking takes place, which is undesirable. I use the term "cracking" in its usual sense to mean a breaking up of the hydrocarbon molecules to form new hydrocarbons.

I have also found that it is possible to produce acetylene without preheating the natural gas at all, but in order to do so, the gas must be compressed to much higher pressures than is necessary when the raw material is preheated.

The use of the hydrocarbons mentioned on page one as the raw material in my process is similar to the use of natural gas and need not be described in detail. The hydrocarbons that are not already in the vapor state must be preheated so that they are in the vapor state before they are admitted to the compression chamber. The conditions of operation are practically the same, but, of course, the amount of preheating and the temperatures to which the various vapors are raised vary somewhat with the different vapors, so that fixed temperatures cannot be given. The final temperatures to which these vapors are raised will in all cases be equal to or greater than the cracking temperature at which substantial amounts of acetylene are formed.

In general I have found that the higher the temperature in the cylinder, the larger the yield of acetylene. This is true for even the highest temperatures that it is practical to obtain by compressing hydrocarbons.

Furthermore, I have found that in using a raw material containing a substantial proportion of hydrocarbons higher than methane, larger yields of acetylene are obtainable than in using ordinary natural gas as the raw material. I use the expression "hydrocarbons higher than methane" in its usual sense to mean hydrocarbons containing a larger proportion of carbon atoms than methane.

As mentioned on page one, I have found that various hydrocarbons are suitable as raw material in my process. The hydrocarbons described on said page one, after being heated to the vapor state, if not already in said vapor state, are hereinafter referred to as a "hydrocarbon vapor". Obviously a suitable raw material may be produced by combining two or more of said compounds.

Although I have described my invention with respect to certain particular embodiments thereof, nevertheless I do not desire to be limited to the particular details shown and described except as clearly specified in the appended claims, since many changes, modifications, and substitutions may be made without departing from my invention in its broader aspects and my invention in its broader aspects may be found useful in many other applications thereof.

I claim as my invention:

1. A method of producing acetylene from a mixture of gases containing hydrocarbons lower in carbon content than acetylene, which comprises: compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable.

2. A method of producing acetylene from a mixture of gases containing hydrocarbons higher than methane, which comprises: compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable.

3. A method of producing acetylene from a mixture of gases containing hydrocarbons lower in carbon content than acetylene, which comprises: preheating said gases to a temperature below that at which substantial cracking of said hydrocarbons occurs; compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable.

4. A method of producing acetylene from a mixture of gases containing hydrocarbons higher than methane, which comprises: preheating said gases to a temperature below that at which substantial cracking of said hydrocarbons occurs; compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable.

5. A method of producing acetylene from a mixture of gases containing hydrocarbons higher than methane, which comprises: compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable, said compression being conducted in such a manner as to substantially limit heat losses from said gases during said compression so that said compression is approximately adiabatic.

6. A method of producing acetylene from a mixture of gases containing hydrocarbons lower in carbon content than acetylene, which comprises: preheating said gases to a temperature below that at which substantial cracking of said hydrocarbons occurs; compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable, said compression being conducted in such a manner as to substantially limit heat losses from said gases during said compression so that said compression is approximately adiabatic.

7. A method of producing acetylene from a mixture of gases containing hydrocarbons lower in carbon content than acetylene, which comprises: preheating said gases to a temperature below 960° F.; compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable.

8. A method of producing acetylene from a mixture of gases containing hydrocarbons higher than methane, which comprises: preheating said gases to a temperature below 960° F.; compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable.

9. A method of producing acetylene from a mixture of gases containing hydrocarbons lower in carbon content than acetylene, which comprises: compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable, said compression being conducted in such a manner as to substantially limit heat losses from said gases during said compression so that said compression is approximately adiabatic.

10. A method of producing acetylene from a mixture of gases containing hydrocarbons higher than methane, which comprises: preheating said gases to a temperature below that at which substantial cracking of said hydrocarbons occurs; compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable, said compression being conducted in such a manner as to substantially limit heat losses from said gases during said compression so that said compression is approximately adiabatic.

11. A method of producing acetylene from a mixture of gases containing hydrocarbons lower in carbon content than acetylene, which comprises: preheating said gases to a temperature below 960° F.; compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable, said compression being conducted in such a manner as to substantially limit heat losses from said gases during said compression so that said compression is approximately adiabatic.

12. A method of producing acetylene from a mixture of gases containing hydrocarbons higher than methane, which comprises: preheating said gases to a temperature below 960° F.; compressing said gases to a sufficient pressure to raise the temperature thereof to at least 2500° F. so that acetylene is formed from said hydrocarbons; releasing said pressure so that said gases are held under said temperature less than one-tenth of a second; and then rapidly cooling the expanded gases containing the acetylene to a temperature at which the acetylene is stable, said compression being conducted in such a manner as to substantially limit heat losses from said gases during said compression so that said compression is approximately adiabatic.

ROBERT G. WULFF.